(12) United States Patent
Ikeda et al.

(10) Patent No.: US 6,250,200 B1
(45) Date of Patent: Jun. 26, 2001

(54) BRAKE BOOSTER

(75) Inventors: Masahiro Ikeda; Yoshiyasu Takasaki; Naohito Saito, all of Saitama-Ken (JP)

(73) Assignee: Bosch Braking Systems Co., Ltd., Tokyo (JP)

(*) Notice: Subject to any disclaimer, the term of this patent is extended or adjusted under 35 U.S.C. 154(b) by 0 days.

(21) Appl. No.: 09/425,339

(22) Filed: Oct. 22, 1999

(30) Foreign Application Priority Data

Nov. 4, 1998 (JP) .................................................. 10-313069

(51) Int. Cl.[7] ...................................................... F15B 9/10

(52) U.S. Cl. ........................................... 91/367; 91/376 R (58) Field of Search ................................. 91/367, 376 R; 92/64

(56) References Cited

U.S. PATENT DOCUMENTS 6,155,156 * 12/2000 Takasaki et al. ...................... 91/367

FOREIGN PATENT DOCUMENTS 9-2243    1/1997   (JP) .

* cited by examiner

Primary Examiner—Edward K. Look
Assistant Examiner—Michael Leslie
(74) Attorney, Agent, or Firm—Flynn, Thiel, Boutell & Tanis, P.C.

(57) ABSTRACT

A brake booster 1 of tandem type includes a solenoid 16 within a valve body 6. The solenoid 16 is provided with a forwardly disposed holder 42 and a rearwardly disposed yoke 43, with a spool 44 held sandwiched therebetween and with a piston 56 disposed to be moveable around the inner periphery. A tubular guide 56A is formed on the front portion of the piston 56 while an annular guide 56B is formed on the rear portion of the piston 56. The tubular guide 56A is slidably fitted into the inner periphery of the holder 42 while the annular guide 56B is slidably fitted into the inner periphery of the yoke 43. When the solenoid 16 is energized to cause the piston 56 to move back and forth relative to the holder 42 and the yoke 43, this movement is guided by the both guides 56A, 56B. This arrangement permits a smooth back-and-forth movement of the piston 56 as compared with the prior art.

10 Claims, 6 Drawing Sheets

BRAKE BOOSTER

FIELD OF THE INVENTION

The invention relates to a brake booster, and more particularly, to a brake booster with a function of an automatic brake.

DESCRIPTION OF THE PRIOR ART

A brake booster which is also capable of functioning as an automatic brake is known in the art, and comprises a valve body slidably disposed within a shell, a power piston mounted on the valve body, a constant and a variable pressure chamber defined across the power piston, a valve mechanism mounted on the valve body for controlling a switching of a flow path, and a solenoid disposed in the valve body for operating the valve mechanism, wherein the valve mechanism comprises a vacuum valve seat formed on the valve body, a tubular member disposed to be movable in the valve body, an atmosphere valve seat formed on the tubular seat, a valve element adapted to be seated on the vacuum and the atmosphere valve seat, and a valve plunger disposed to be movable relative to the valve body and the tubular member and driven forward together with the tubular member as an input shaft is driven forward, and wherein the solenoid comprises a housing mounted on the inner periphery of the valve body, a spool contained in the housing and around which a coil is disposed, and a piston disposed to be moveable along the inner periphery of the housing for interlocked movement with the tubular member, the arrangement being such that as the solenoid is energized, the piston and its interlocked tubular member are caused to move forward relative to the valve body and the valve plunger to operate the valve mechanism.

In the conventional brake booster mentioned above, as the solenoid is energized, both the piston and the tubular member are caused to move forward relative to the valve body and the valve plunger, whereby the atmosphere valve seat formed on the tubular member is removed from the valve element, allowing the brake booster to be actuated as an automatic brake without depressing a brake pedal.

It will be noticed that in the conventional arrangement, it is necessary that the piston and the tubular member be allowed to move back and forth smoothly when the brake booster is to be actuated as an automatic brake. Accordingly, there has been need in the conventional brake booster as mentioned above to allow a more smooth movement of the piston and the tubular member.

SUMMARY OF THE INVENTION

In view of the foregoing, in a brake booster as mentioned above, in accordance with the invention, a tubular guide is formed on a front portion of the piston while an annular guide is formed on a rear portion of the piston in a manner such that both the tubular guide and the annular guide are slidably fitted into the inner periphery of the housing for guiding a movement of the piston within the housing, while an outer periphery of the valve plunger toward its front end is slidably fitted into the inner periphery of the housing and an outer periphery of the valve plunger toward its axial center is slidably fitted into the inner periphery of the housing for guiding a back-and-forth movement of the valve plunger within the housing.

With the described arrangement, the piston is allowed to move back and forth smoothly within the housing as it is guided by both the tubular and annular guide while the valve plunger is allowed to move back and forth smoothly as a result of the guiding action provided by the inner periphery of the housing for the outer periphery of the valve plunger toward the front end and toward the axial center thereof. This assures a more smooth movement of the piston and the valve plunger as compared with the prior art.

DETAILED DESCRIPTION OF THE EMBODIMENT

Figure 1:
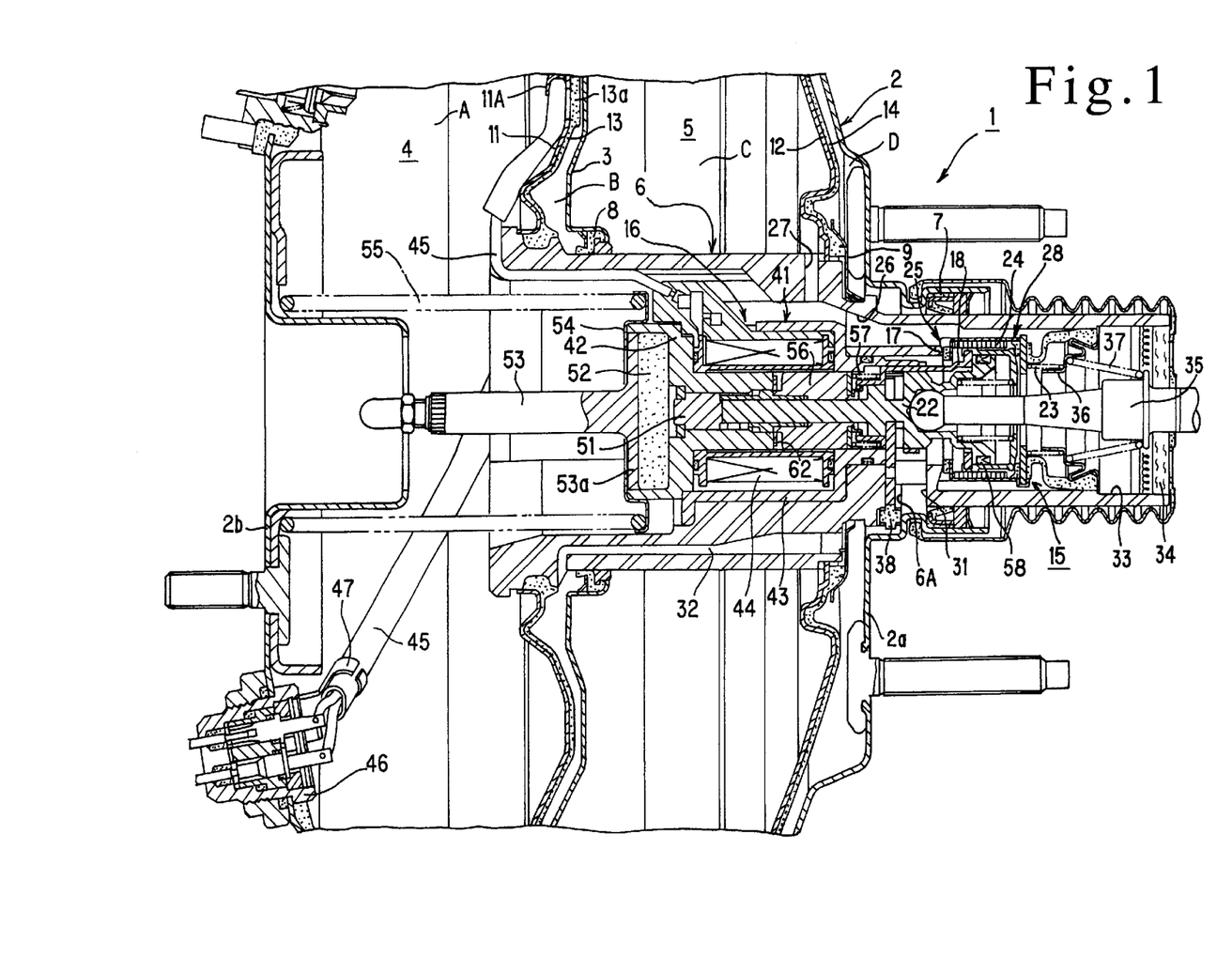
FIG. 1 is a cross section of one embodiment of the invention.
Figure 2:
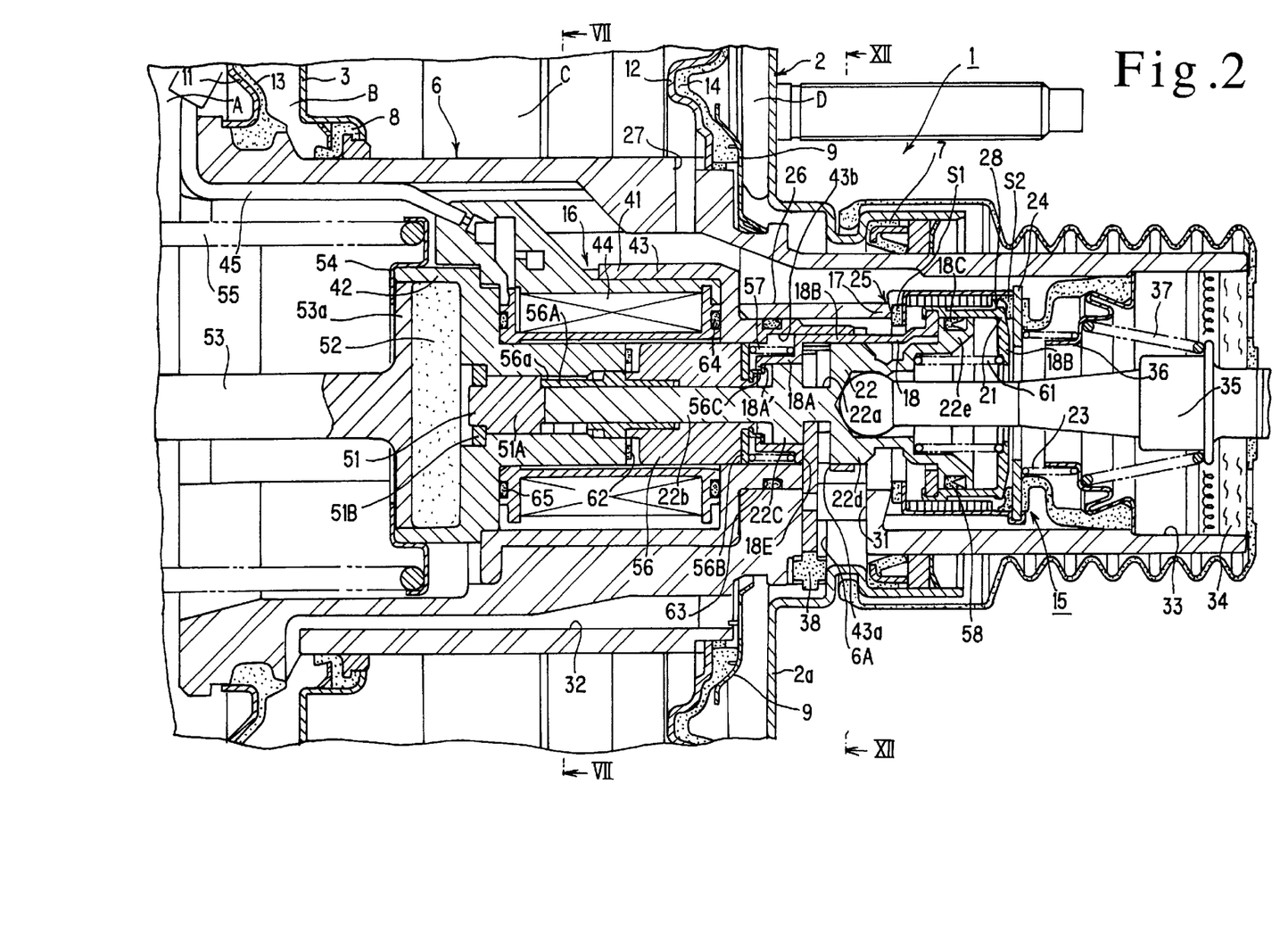
FIG. 2 is an enlarged view of part shown in FIG. 1.

An embodiment of the invention will be described with reference to the drawings. Referring to FIGS. 1 and 2, a brake booster 1 of tandem type includes a shell 2, the interior of which is partitioned by a center plate 3 into a forwardly located front chamber 4 and a rearwardly located rear chamber 5. A substantially tubular valve body 6 slidably extends through the inner periphery of the shell 2 at its rear end, or the right end as viewed in the drawings, and through the inner periphery of the center plate 3, with seal means 7 and 8 disposed thereat to maintain a hermetic seal.

A front power piston 11 and a rear power piston 12 are connected to the outer periphery of the valve body 6 at locations which are disposed within the front chamber 4 and the rear chamber 5, respectively. A front diaphragm 13 and a rear diaphragm 14 are applied to the back surfaces of the power pistons 11 and 12, respectively. The inner periphery of both the rear power piston 12 and the rear diaphragm 14 is detained to the outer periphery of the valve body 6 by an annular retainer 9. The front diaphragm 13 partitions the front chamber 4 into a constant pressure chamber A and a variable pressure chamber B while the rear diaphragm 14 partitions the rear chamber 5 into a constant pressure chamber C and a variable pressure chamber D.

A valve mechanism 15 which switches a communication between the constant pressure chambers A and C and the variable pressure chambers B and D is disposed within the valve body 6, and a solenoid 16 is disposed forwardly of the valve mechanism 15.

The valve mechanism 15 comprises an annular, vacuum valve seat 17 formed on the inner periphery of the valve body 6, a tubular member 18 disposed to be axially movable relative to the valve body 6, an annular atmosphere valve seat 21 formed on the tubular member 18, a valve plunger 22 slidably fitted into the tubular member 18 for interlocked movement with an input shaft 35, and a valve element 24 urged from the rear side by a spring 23 so as to be seated on the vacuum and the atmosphere valve seat 17 and 21.

A combination of the vacuum valve seat 17 and a first seat area S1 on the valve element 24 which moves into engagement or disengagement from the vacuum valve seat 17 defines a vacuum valve 25. A space located radially outward of the vacuum valve 25 communicates with the constant pressure chamber A through a first constant pressure passage 26 formed in the valve body 6. The constant pressure chamber A communicates with the constant pressure chamber C through a second constant pressure passage 27 which continues from the first constant pressure passage 26. The constant pressure chamber A communicates with a source of negative pressure through a negative pressure introducing tube, not shown, whereby a negative pressure is normally introduced into the constant pressure chambers A and C.

A combination of the atmosphere valve seat 21 and a second seat area S2 on the valve element 24 which moves into engagement with or disengagement from the atmosphere valve seat 21 defines an atmosphere valve 28. A space located intermediate between the second seat area S2 and the first seat area S1 communicates with the variable pressure chamber D through a radially extending first variable pressure passage 31 formed in the valve body 6, and the variable pressure chamber D in turn communicates with the variable pressure passage B through an axially extending second variable pressure passage 32 also formed in the valve body 6.

A space located radially inward of the atmosphere valve 28 communicates with the atmosphere through an atmosphere passage 33 formed in the valve body and a filter 34 disposed therein.

The valve plunger 22 has a rear end which is pivotally connected with the distal end of the input shaft 35, and a spring 37 having a greater resilience than the spring 23 is disposed across a retainer 36 fitted around the valve body 6 and the outer periphery of the input shaft 35.

Accordingly, in the inoperative condition of the brake booster 1 of tandem type shown in FIG. 1, the second seat area S2 on the valve element 24 is seated on the atmosphere valve seat 21 to close the atmosphere valve 28 while the first seat area S1 on the valve element 24 is removed from the vacuum valve seat 17 to open the vacuum valve 25. It is to be understood that the terminal end of the input shaft 35 is connected with a brake pedal, not shown. In this inoperative condition, the chambers A, B, C and D communicate with each other, and thus a negative pressure is introduced into each of these chambers.

A radial bore 6A is formed in the valve body 6 forwardly of and continuing from the first variable pressure passage 31, and a key member 38 which is known in itself is inserted into the radial bore 6A for engagement with an engaging portion 22a of the valve plunger 22.

In the inoperative condition of the brake booster 1 of tandem type shown in FIG. 1, the key member 38 is disposed in abutment against the rear wall surface 2a of the shell 2 to maintain the key member 38 and the valve plunger 22 at advanced positions relative to the valve body 6, thereby reducing the lost motion of the input shaft 35 at the commencement of operation of the break booster 1 of tandem type.

A housing 41 for a solenoid 16 is fitted along the inner periphery of the valve body 6 over a region from the location of the first variable pressure passage 31 and extending forwardly thereof while maintaining a hermetic seal. The housing 41 comprises a foremost holder 42 in the form of a stepped cylinder having an increased diameter toward its front end, and a rearmost yoke 43 in the form of a stepped cylinder having an increased diameter toward its front end (see FIGS. 5, 10 and 11). A cylindrical spool 44 having a coil disposed thereon is inserted into a portion of the yoke 43 having an increased diameter from the front side, and under this condition, the rear portion of the holder 42 is fitted into the inner periphery of the spool 44, thus holding the spool 44 axially sandwiched between the rearwardly facing stepped end face of the holder 42 and the forwardly facing stepped end face of the yoke 43. While maintaining such condition, the yoke 43 is fitted into the inner periphery of the valve body 6 while maintaining a hermetic seal.

Lead wires connected to the coil on the spool 44 are supported initially by the inner periphery, toward the front end, and then the front end face of the valve body 6 and are then supported by the front end face of the front power piston 11. One of the lead wires 45 which is located within the shell 2 is connected to a connector 46 attached to a front wall surface 2b of the shell 2, and is held in place by a retainer 47 so as to prevent its disengagement from the connector 46.

A plunger plate 51 is slidably fitted into the inner periphery of a portion of the holder 42 having a reduced diameter toward the front portion thereof, and a reaction disc 52 is received in a portion of the holder 42 having an increased diameter which is located forwardly of the plunger plate 51. In the present embodiment, the plunger plate 51 comprises a rearwardly located solid cylinder member 51A and a forwardly located annular member 51B. A cylindrical projection is formed on the front end face of the solid cylinder member 51A, and extends through the annular member 51B. In this manner, the rear end face of the reaction disc 52, the annular member 51B and the end face of the projection from the solid cylinder member 51A are disposed in opposing relationship to each other.

An output shaft 53 is disposed forwardly of the reaction disc 52, and has an end 53a of an increased diameter which slidably fits in a portion of the holder 42 having an increased diameter and is disposed in abutment against the reaction disc 52 from the front side. In this manner, the reaction disc 52 is held sandwiched between the rear end face of the end 53a of the output shaft 53 and the stepped end face of the holder 42. In the inoperative condition of the brake booster 1 of tandem type shown in FIG. 1, the rear end face of the reaction disc 52 and the opposing front end face of the plunger plate 51, or the end face of the projection on the solid cylinder member 51A are slightly spaced apart.

A dish-shaped retainer 54 is fitted around the front end of the holder 42, and prevents the end 53a of the output shaft 53 from being disengaged from the outer periphery of the holder 42.

A return spring 55 is disposed between the retainer 54 and the front wall surface 2b of the shell 2, thus maintaining the valve body 6 and other members in their inoperative positions shown.

The front end of the output shaft 53 projects externally through the front wall surface 2b of the shell 2 for connection with a piston of a master cylinder, not shown.

A cylindrical piston 56 formed of a magnetizable material is slidably fitted in the inner periphery of the spool 44 and the yoke 43 at a location rearward of the plunger plate 51.

In the present embodiment, the solenoid 16 used is of an ON/OFF controlled type, and its operation is controlled by a controller, not shown. When the solenoid 16 is energized by the controller, the piston 56 is caused to move forwardly relative to the spool 44, the yoke 43, the holder 42 and the valve body 6.

In the present embodiment, a tubular member 18 is disposed rearward of the piston 56 so that they are interlocked for movement, and the valve plunger 22 is slidably fitted inside these members.

Figure 3:
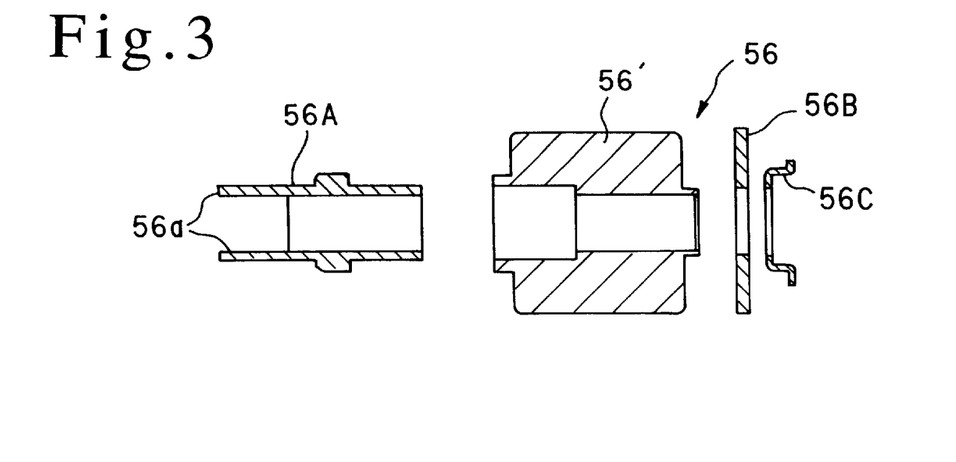
FIG. 3 is a cross section of members which form a piston shown in FIG. 1.
Figure 4:
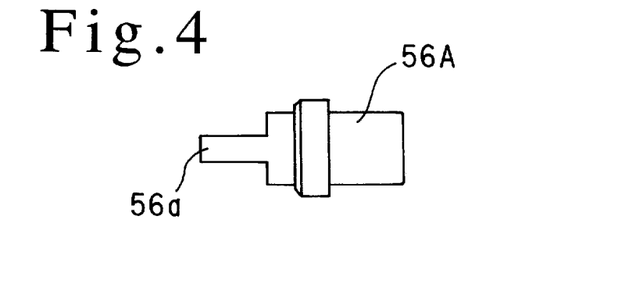
FIG. 4 is a front view of part shown in FIG. 3.

Referring to FIGS. 3 and 4, the piston 56 includes a front shank which is integrally formed with a forwardly extending tubular guide 56A, the front end of which is disposed in abutment against the rear end face of the plunger plate 51, or more specifically, the solid cylinder member 51A, and the outer periphery of which is slidably fitted into the inner periphery of the holder 42. The piston 56 also includes a rear shank which is also tubular and around which an annular guide 56B is fitted so as to be in tight contact with a rear stepped end face of the piston 56. The inner periphery of an annular engaging portion 56C is fitted around the rear shank of the piston 56 from the rear side of the annular guide 56B, and the rear shank of the piston 56 is then caulked radially outward. In this manner, the annular guide 56B and the inner periphery of the engaging portion 56C are integrally held sandwiched between the caulked portion and the rear end face of the piston 56. While the piston 56 includes a body portion of a magnetizable material, the tubular guide 56A and the annular guide 56B are formed of an nonmagnetic material.

The annular guide 56B has an outer diameter which is slightly greater than the outer diameter of the piston 56 so that when the piston 56 moves back and forth within the housing 41, the outer periphery of the annular guide 56B is in sliding contact with the inner periphery of the yoke 43 and the tubular guide 56A is in sliding contact with the inner periphery of the holder 42. In other words, in the present embodiment, a slight clearance is maintained between the outer peripheral surface of the piston 56 and the inner peripheral surfaces of the spool 44 and the yoke 43 which are fitted therein to allow an axial movement of the piston 56 under this condition.

The rear end of the engaging portion 56C is formed as a flange which extends radially outward, and a given clearance is maintained between the flange and the rear end face of the annular guide 56B which is disposed forwardly thereof. An engaging portion 18A' which is defined by the front end of the tubular member 18 is located within the clearance.

Figure 8:
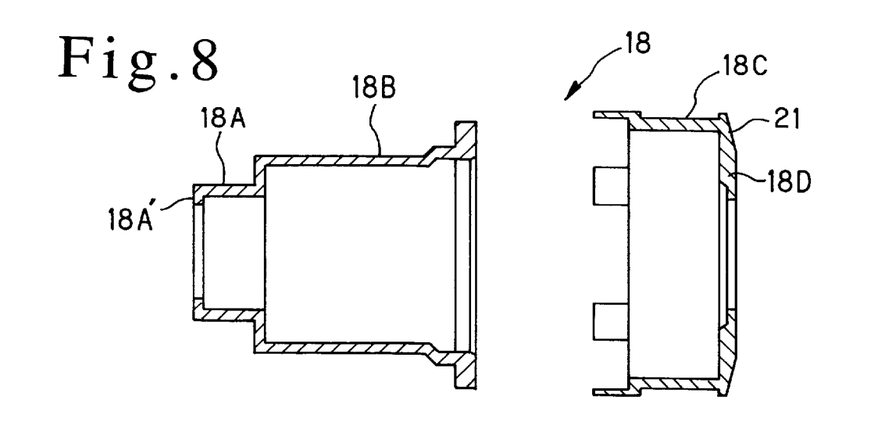
FIG. 8 is a cross section of members which form a tubular member shown in FIG. 1.
Figure 9:
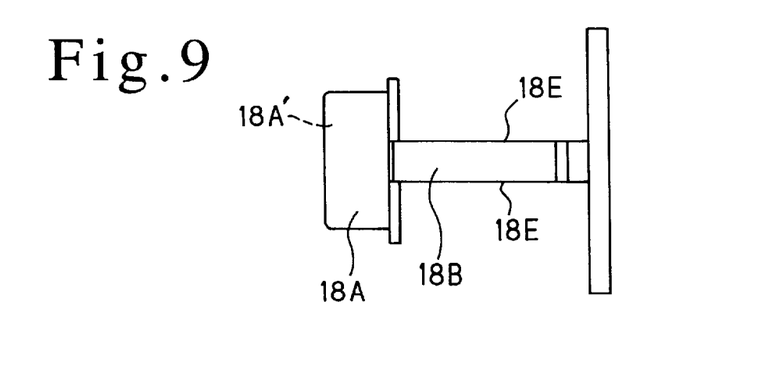
FIG. 9 is a front view of a left-hand member shown in FIG. 8.

Referring to FIGS. 8 and 9, the tubular member 18 is formed as a stepped cylinder having a sequentially decreasing diameter as viewed in the forward direction. A portion 18A of a small diameter has a front end, which is folded radially inward to define the engaging portion 18A' while a portion 18C of a large diameter has a rear end which extends radially inward to provide a radial portion 18D.

The portion 18A having a small diameter of the tubular member 18 is inserted into the inner periphery of the yoke 43 so that the front end of the portion 18 (or the engaging portion 18A') is slidably fitted around the outer periphery of the engaging portion 56C of the piston 56, whereby the engaging portion 18A' is located between the rear end face of the piston 56 and the flange on the engaging portion 56C. At the same time, the outer periphery of a portion 18B of the tubular member 18 which has an intermediate diameter is slidably fitted into the inner periphery of the yoke 43.

A spring 57 is disposed between the rear end face of the annular guide 56B of the piston 56 and the opposing stepped end face of the tubular member 18, and accordingly, the piston 56 and the tubular member 18 are urged away from each other or in the axial direction as viewed in the drawings, whereby the engaging portion 18A' of the tubular member 18 abuts against the flange or the rear end of the engaging portion 56C of the piston 56. In other words, the engaging portion 18A' is capable of an axial movement between the annular guide 56B and the flange on the engaging portion 56C of the piston 56, thus permitting an axial relative movement between the piston 56 and the tubular member 18 through a distance corresponding to the axial movement of the engaging portion 18A'.

In the present embodiment, the valve element 24 is constructed such that the first seat area S1 and the second seat area S2 are axially spaced apart and have an equal diameter. Thus, both the vacuum valve 25 and the atmosphere valve 28 have an equal diameter. The portion 18C of the tubular member 18 having a large diameter is disposed between the first seat area S1 and the second seat area S2. In the present embodiment, the atmosphere valve seat 21 is defined by the outer peripheral edge of the radial portion 18D of the tubular member 18.

The valve plunger 22 will be specifically described. In the present embodiment, since the atmosphere valve seat 21 is formed on the tubular member 18, the valve plunger 22 of the present embodiment is not formed with an atmosphere valve seat 21, but is in the form of a stepped circular rod having a sequentially decreasing diameter at the front end of each step.

Specifically, the valve plunger 22 includes a small diameter portion 22b which is provided as a front portion, an intermediate diameter portion 22c which follows the portion 22b, and a large diameter portion 22d which follows the portion 22c. The large diameter portion 22d has a rear end which is formed as a flange 22e which extends radially outward.

The small diameter portion 22b of the valve plunger 22 is slidably inserted into the piston 56 from the rear side thereof while simultaneously slidably fitting a portion located rearward of the intermediate diameter portion 22c into the inner periphery of the tubular member 18. In this manner, the intermediate diameter portion 22c is slidably fitted into the inner periphery of the portion 18A of the tubular member 18 having a reduced diameter, the large diameter portion 22d is slidably fitted into the inner periphery of the portion 18B of the tubular member 18 having an intermediate diameter, and the flange 22e is slidably fitted into the inner periphery of the portion 18C of the tubular member 18 having an increased diameter.

A seal member 58 is mounted around the outer periphery of the flange 22e, thus maintaining a hermetic seal between the flange 22e and the inner periphery of the portion 18C of the tubular portion 18 having an increased diameter.

Figure 10:
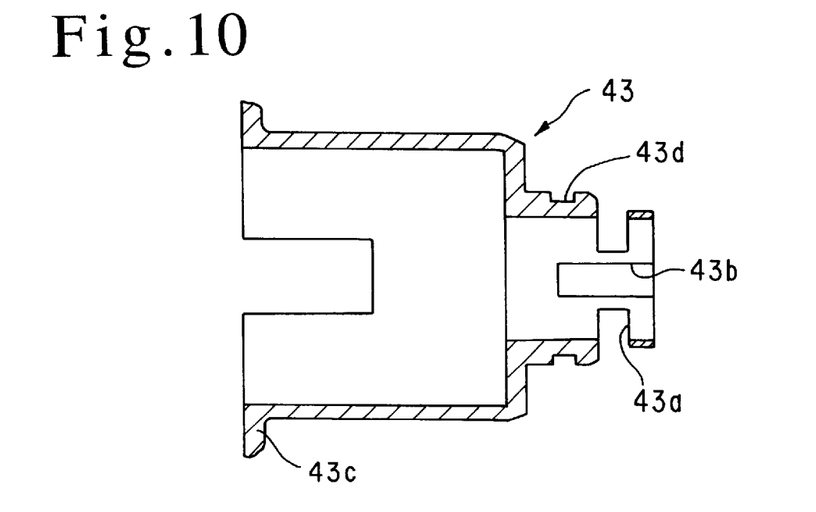
FIG. 10 is a cross section of a yoke 43 shown in FIG. 1.

An annular groove is formed in the intermediate diameter portion 22c in a rear region thereof to define an engaging portion 22a which is engaged by the key member 38. A notch 18E is formed in the portion 18B of the tubular member 18 having an intermediate diameter to permit the key member 38 to be inserted into the engaging portion 22a. As shown in FIG. 10, the yoke 43 is also formed with a notch 43a in alignment with the location of the radial bore 6A formed in the valve body 6 to permit the key member 38 to pass through a rear end thereof. The input shaft 35 is pivotally connected to the rear shank of the valve plunger 22, as mentioned previously.

A spring 61 is disposed between the rear shank of the valve plunger 22 and the opposing radial portion 18D of the tubular member 18, whereby the valve plunger 22 is normally urged forwardly relative to the tubular member 18 to maintain the flange 22e in abutment against the stepped end face between the portions 18C and 18B of the tubular member 18 having an increased diameter and an intermediate diameter, respectively, and to maintain the front end face of the valve plunger 22, or specifically, the front end face of the small diameter portion 22b in abutment against the rear end face of the plunger plate 51 or more specifically, the solid cylinder member 51A.

A rubber ring 62 is adhesively bonded to the rear end face of the holder 42 which opposes the front end face of the piston 56. When the solenoid 16 is energized to drive the piston 56 forwardly, the front end face of the piston 56 abuts against the ring 62, thus preventing the piston 56 from directly impacting the rear end face of the holder 42 during its movement to produce sounds of percussion.

Operation

With the described arrangement, in the inoperative condition shown in FIGS. 1 and 2 where the solenoid 16 is not energized and when a brake pedal, not shown, is not depressed, the valve plunger 22 is engaged with the key member 38 which abuts against the wall surface 2a of the shell 2 to be maintained in its inoperative position shown. The flange 22e of the valve plunger 22 abuts against the stepped end face of the tubular member 18, while the front end face of the valve plunger 22 abuts against the plunger plate 51. The atmosphere valve seat 21 formed on the tubular member 18 is seated on the second seat area S2 on the valve element 24 to close the atmosphere valve 28 while the first seat area S1 on the valve element 24 is spaced from the vacuum valve seat 17 to open the vacuum valve 25.

The engaging portion 56C of the piston 56 is engaged with the front end or the engaging portion 18A' of the tubular member 18, whereby the piston 56 assumes a retracted rear position with respect to the housing 41. A clearance is maintained between the front end face of the piston 56 and the opposing ring 62.

A slight clearance is also maintained between the front end face of the plunger plate 51 or the end face of the projection on the solid cylinder member 51A and the rear end face of the reaction disc 52.

Since the vacuum valve 25 is open while the atmosphere valve 28 is closed as mentioned above, the chambers A, B, C and D communicate with each other, and a negative pressure is introduced into these chambers.

When a brake pedal, not shown, is depressed under this inoperative condition, the input shaft 35, the valve plunger 22 and tubular member 18 are integrally driven forward. This causes the second seat area S2 on the valve element 24 to be removed from the atmosphere valve seat 21 to open the atmosphere valve 28 while the first seat area S1 on the valve element 24 becomes seated on the vacuum valve seat 17 to close the vacuum valve 25. Accordingly, a communication between the both constant pressure chambers A and C and the both variable pressure chambers B and D is interrupted, while the atmosphere is introduced into the both variable pressure chambers B and D. A pressure differential between the negative pressure in the both constant pressure chambers A and C and the atmospheric pressure in the both variable pressure chambers B and D drives the both power pistons 11 and 12, the valve body 6 and other associated members forward.

As the tubular member 18 is driven forward in the manner mentioned above, there occurs a slight movement of the tubular member 18 relative to the piston 56 in the forward direction, but the engaging portion 18A' of the tubular member 18 does not abut against the annular guide 56B, but remains intermediate the annular guide 56B and the engaging portion 56C. In this manner, if the valve plunger 22 is driven forward, this can not cause a forward movement of the piston 56.

The brake booster 1 of tandem type is actuated in this manner, and a reaction from the output acting on the output shaft 53 causes an axial portion of the reaction disc 52 to bulge rearward, resulting in an abutment against the plate plunger 51. Accordingly, from this time on, a reaction from the output acting on the output shaft 53 is transmitted through the valve plunger 22 and the input shaft 35 to a driver.

If a driver releases the brake pedal under the actuated condition, the return spring 55 allows the valve body 6 and other members to be returned to their inoperative conditions shown in FIG. 1.

The above description covers a normal operation of the brake booster 1 of tandem type when a break pedal is depressed. In other words, unless the solenoid 16 is energized, the tubular member 18 moves back and forth in an integral manner with the valve plunger 22 and the input shaft 35.

Operation as an Automatic Brake

By contrast, when the brake booster 1 of tandem type is to be actuated as an automatic brake, a controller, not shown, is used to energize the solenoid 16 under the inoperative condition shown in FIG. 1 without depressing a brake pedal.

This causes the piston 56 to move forward relative to the housing 41 while simultaneously moving the tubular member 18 forward relative to the valve body 6 and the valve plunger 22.

In response thereto, the second seat area S2 on the valve element 24 is removed from the atmosphere valve seat 21 to open the atmosphere valve 28 while the first seat area S1 on the valve element 24 becomes seated on the vacuum valve seat 17 to close the vacuum valve 25. Accordingly, the atmosphere is introduced into the both variable pressure chambers B and D, thus driving the both power pistons 11 and 12, the valve body 6 and other associated members forward. In this manner, the brake booster 1 of tandem type is actuated as an automatic brake.

When the solenoid 16 is deenergized under the actuated condition, the springs 57 and 61 are effective to return the tubular member 18 and the piston 56 rearward with respect to the valve plunger 22, whereby the atmosphere valve 28 is closed while the vacuum valve 25 is opened. As a consequence, the return spring 55 returns the valve body 6 and other members to their inoperative positions shown in FIG. 1.

The present embodiment is directed to providing an improvement in assuring a more smooth back-and-forth movement when the piston 56 of the solenoid 16, the tubular member 18 and the valve plunger 22 move axially.

While the arrangement has been summarily described above, the piston 56 according to the present embodiment comprises the tubular guide 56A of a non-magnetic material, a body 56' of a magnetizable material, the annular guide 56B of a non-magnetic material and the engaging portion 56C in the form of an annular retainer.

As mentioned above, the body 56' includes a tubular portion which projects from the rear shank thereof, and the annular guide 56B and the engaging portion 56C are sequentially fitted on the tubular portion from the rear side, and then the end of the tubular portion of the rear shank of the body 56' is folded radially outward for purpose of caulking (FIG.

2). In this manner, the annular guide 56B and the engaging portion 56C are integrally mounted on the rear end face of the body 56'. The annular guide 56B has an outer diameter which is slightly greater than the outer diameter of the body 56', and is slidably fitted into the inner periphery of the yoke 43.

On the other hand, as shown in FIGS. 3 and 4, the tubular guide 56A is formed on its front end with a pair of feet 56a which extend axially forward.

Figure 5:
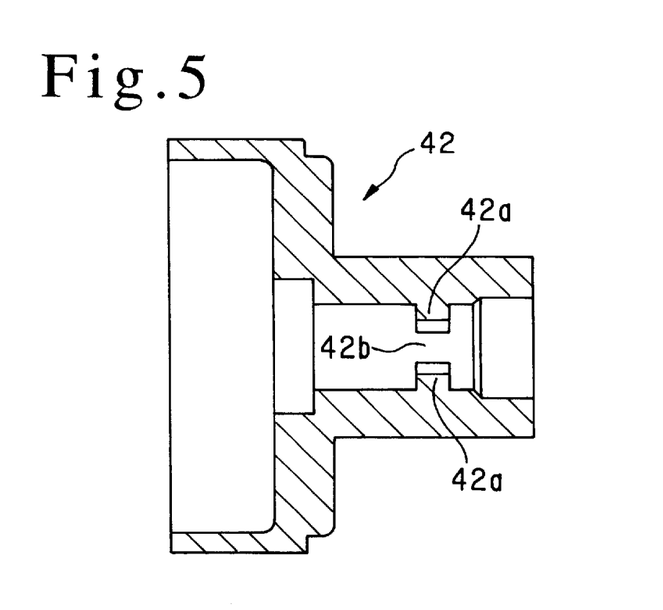
FIG. 5 is a cross section of a holder 42 shown in FIG. 1.
Figure 6:
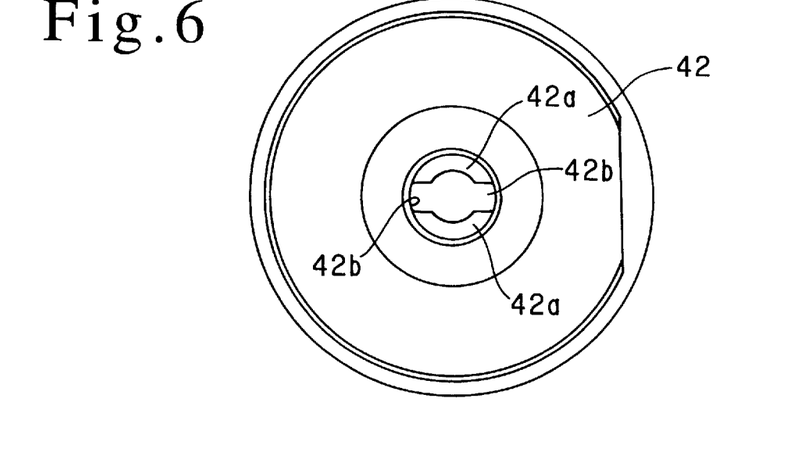
FIG. 6 is a right-hand side elevation of FIG. 5.

On the other hand, as shown in FIGS. 5 and 6, the inner periphery of the holder 42 is formed with a pair of opposing arcuate bulges at a given location in the axial direction, these bulges serving as sliding guides 42a. An axially extending guide groove 42b is defined at a circumferential boundary between the sliding guides 42a.

Figure 7:
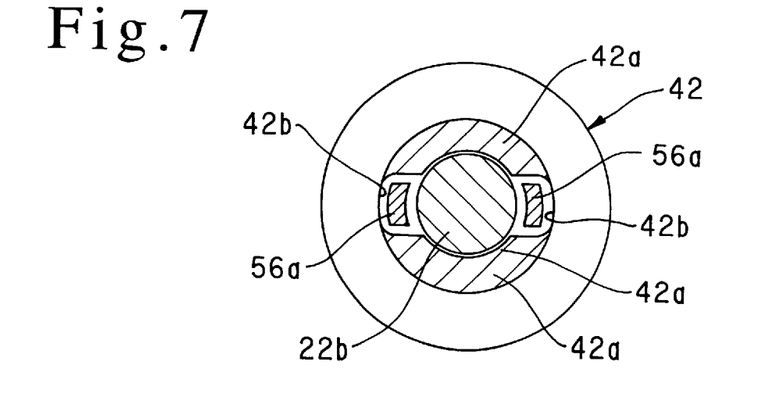
FIG. 7 is a cross section taken along the line VII—VII shown in FIG. 2.

Referring to FIG. 7, it will be noted that the small diameter portion 22b located toward the front end of the valve plunger 22 is slidably fitted inside the inner periphery of the sliding guide 42a. In this manner, the sliding guide 42a is effective to guide the small diameter portion 22b of the valve plunger 22 for axial movement. The pair of feet 56a formed on the tubular guide 56 A of the piston 56 are inserted into the guide groove 42b, and have their front ends disposed in abutment against the plate plunger 51, or more specifically, the solid cylinder member 51A (FIG. 2).

Referring to FIGS. 8 and 9, it will be seen that the tubular member 18 comprises a front member on which the portion 18A of a reduced diameter and the portion 18B of an intermediate diameter are formed, and a rear member on which the portion 18C of an increased diameter and a radial portion 18D are formed, the rear member being fitted over the front member so as to be integral therewith.

Referring to FIG. 9, the portion 18B of an intermediate diameter has its both circumferential sides largely notched to define the notch 18E, whereby the portion 18B appears to be like a pair of axially extending bands. The notch 18E allows the key member 38 to pass therethrough (FIG. 2).

Figure 11:
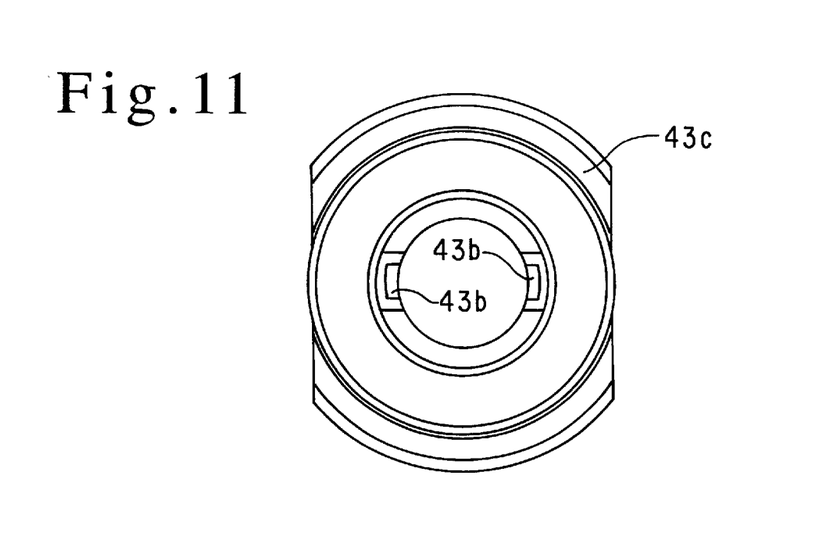
FIG. 11 is a right-hand side elevation of FIG. 10.

Referring to FIGS. 10 and 11, the yoke 43 comprises a magnetizable metal and is formed with a pair of axially extending guide grooves 43b at locations which are circumferentially offset by 180° in its inner periphery toward the rear end. At the location of the guide grooves 43b, it is also formed with notches 43a through which the key member 38 extends.

The front end of the yoke 43 is formed with a flange 43c which extends radially outward. In addition, at a location forwardly of the notches 43a, the yoke 43 is formed with an annular groove 43d in its outer periphery in which an annular seal member is mounted.

The band-shaped portions 18B of an intermediate diameter of the tubular member 18 are slidably fitted into the guide grooves 43b in the yoke 43 (FIG. 2), thereby allowing a smooth back-and-forth movement of the tubular member 18 along the guide grooves 43b as the tubular member 18 is caused to move axially with respect to the yoke 43 and the valve body 6.

Figure 12:
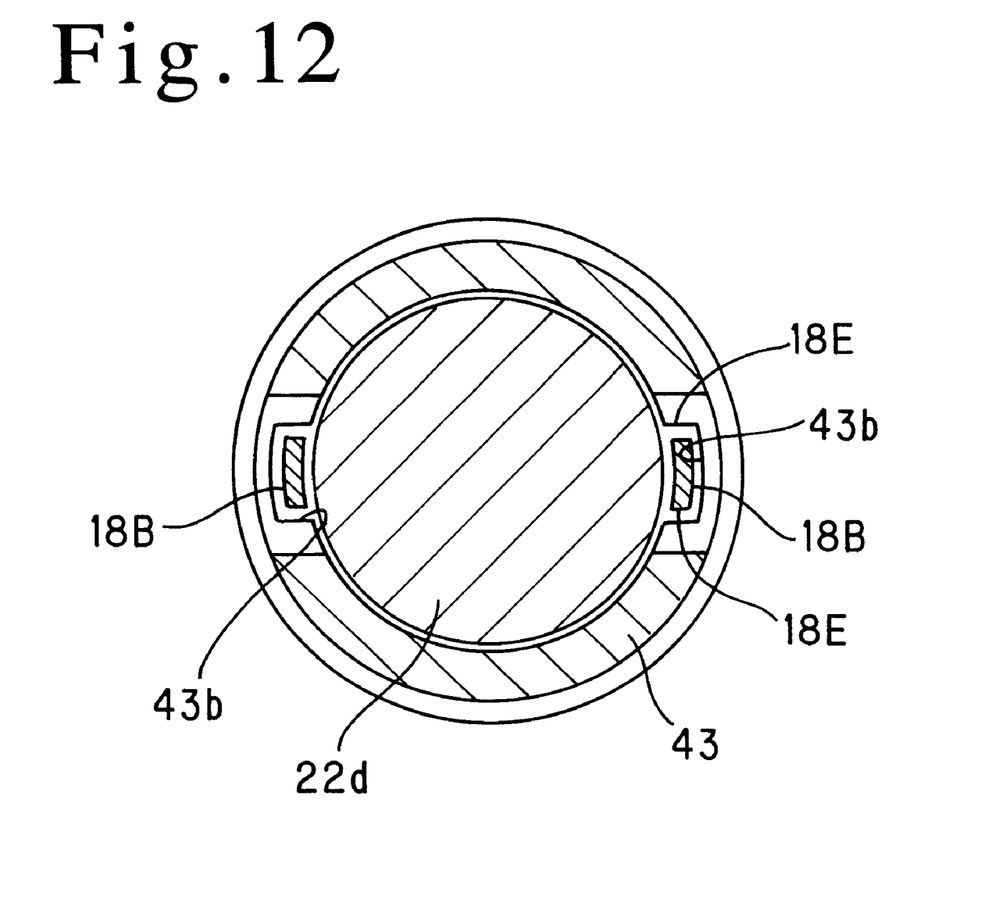
FIG. 12 is a cross section taken along the line XII—XII shown in FIG. 2.

Finally, the intermediate diameter portion 22c of the valve plunger 22 is slidably fitted into the portion 18A of a reduced diameter of the tubular member 18, and the large diameter portion 22d of the valve plunger 22 is slidably fitted into the portion 18B of an intermediate diameter of the tubular member 18 while simultaneously being slidably fitted into the inner periphery of the yoke 43 through the notch 18E (see FIG. 12).

As mentioned above, the piston 56 is provided with the tubular guide 56A at an axially front location and also provided with the annular guide 56B at an axially rear location, both of which serve the purpose of guiding the axial movement, and thus it can smoothly move back and forth within the housing 41. Because both of the tubular guide 56A and the annular guide 56B are formed of a non-magnetic material, a sliding resistance experienced when it moves in sliding contact with the inner periphery of the housing 41 (namely, holders 42 and yoke 43) can be reduced. This also contributes to achieving a smooth movement of the piston 56 in the axial direction.

By having the portion 18B of an intermediate diameter guided by the axial grooves 43b in the yoke 43, the tubular member 18 is also enabled to move smoothly in the axial direction. The valve plunger 22 is also capable of smoothly moving in the axial direction by having its small diameter portion 22b guided by the sliding guide 42a on the holder 42 and by having its large diameter portion 22d guided by the inner periphery of the yoke 43.

By constructing the rear shank of the piston 56 and the front end of the tubular member 18 in the manner mentioned above, a relative axial movement therebetween is permitted. In this manner, a relative axial movement between the piston 56 and the tubular member 18 is enabled with a simple arrangement.

As mentioned previously, the rubber ring 62 is mounted on the rear end face of the holder 42 which opposes the front end face of the piston 56 (FIG. 2), and accordingly, as the solenoid 16 is energized to move the piston 56 forward, the front end face of the piston 56 abuts against the rubber ring 62 while avoiding a direct abutment against the rear end face of the holder 42. In this manner, the occurrence of the sounds of percussion as a result of the abutment between the front end face of the piston 56 and the rear end face of the holder 42 can be prevented.

The presence of the rubber ring 62 avoids a direct contact between the front end face of the piston 56 and the rear end face or the holder 42, whereby as the solenoid 16 is deenergized to return the piston 56 rearward, the extinction of a force of magnetic attraction which has been acting upon the piston 56 can be accelerated.

The key member 38 is capable of an axial movement relative to the valve body 6 in an extent determined by the axial size of the notch 43a in the yoke 43, and thus the retracted position of the key member 38 with respect to the valve body 6 is determined by the position where it abuts against the rear edge of the notch 43a.

An input subsequent to a full load point during a normal operation of the brake booster 1 of tandem type in which a brake pedal is depressed is received through an abutment of the key member 38 against the front edge of the notch 43a formed on the yoke 43. Because the yoke 43 is formed of metal, a need to increase the strength of the valve body 6 is avoided as compared with when the key member 38 abuts against a valve body 6 which is formed of a synthetic resin, thus allowing a reduction in the size of the valve body 6 by a corresponding amount.

When the atmosphere valve 28 is open, the atmosphere which is introduced through the atmosphere valve 28 is introduced into the variable pressure chamber D through the radially extending, first variable pressure passage 31 formed in the valve body 6. Since the key member 38 is inserted into the radial bore 6A, the flow of the atmosphere which is introduced into the variable pressure chamber D can not be interfered by the key member 38, thus improving the operational response of the brake booster 1 of tandem type.

In addition, the spool 44 is held sandwiched between the holder 42 and the yoke 43, and under this condition, the yoke 43 is fitted into the inner periphery of the valve body 6. The retainer 54 is fitted with the holder 42 which assumes such condition, and the rear end of the return spring 55 abuts against the retainer 54 to maintain the holder 42, the yoke 43, and the spool 44 along the inner periphery of the valve body 6. By having the flange 43e of the yoke 43 disposed in abutment against the front stepped end face of the valve body 6, the yoke 43 and the holder 42 are positioned at given axial positions within the valve body 6 while preventing the withdrawal of the solenoid 16 from the valve body 6.

As a result of the described arrangement of the present embodiment, the mounting of the solenoid 16 on the valve body 6 is simplified, and accordingly, an assembly of the brake booster 1 of tandem type is facilitated.

As shown in FIG. 2, an annular seal member 63 is mounted in the annular groove 43d formed in the yoke 43 to maintain a hermetic seal between the yoke 43 and the inner peripheral surface of the valve body 6. Annual seal members 64 and 65 are also mounted on the front and the rear end face of the spool 44, thus maintaining a hermetic seal between the rear end face of the spool 44 and the stepped end face of the yoke 43 and also maintaining a hermetic seal between the front end face of the spool 44 and the stepped end face of the holder 42.

While the embodiment has been described above as an application of the present invention to a brake booster of tandem type, it should be understood that the invention is equally applicable to a brake booster of a single type having a pair of constant and variable pressure chambers or a brake booster of a triple type having 3 pairs of constant and variable pressure chambers.

While the invention has been described above in connection with a preferred embodiment thereof, it should be understood that a number of changes, modifications and substitutions therein are possible from the above disclosure without departing from the spirit and the scope of the invention defined by the appended claims.

What is claimed is:

1. A brake booster including a valve body slidably disposed within a shell, a power piston mounted on the valve body, a constant and a variable pressure chamber defined across the power piston, a valve mechanism mounted on the valve body for controlling a switching of a flow path, and a solenoid disposed in the valve body for operating the valve mechanism;

wherein the valve mechanism comprises a vacuum valve seat formed on the valve body, a tubular member disposed to be movable in the valve body, an atmosphere valve seat formed on the tubular seat, a valve element adapted to be seated on the vacuum valve seat and the atmosphere valve seat, and a valve plunger disposed to be movable relative to the valve body and the tubular member and driven forward together with the tubular member as an input shaft is driven forward;

and wherein the solenoid comprises a housing mounted on the inner periphery of the valve body, a spool contained in the housing and around which a coil is disposed, and a piston disposed to be moveable along the inner periphery of the housing for interlocked movement with the tubular member, the arrangement being such that as the solenoid is energized, the piston and its interlocked tubular member are caused to move forward relative to the valve body and the valve plunger to operate the valve mechanism;

characterized in that a tubular guide is formed on a front portion of the piston while an annular guide is formed on a rear portion of the piston in a manner such that both the tubular guide and the annular guide are slidably fitted into the inner periphery of the housing for guiding a movement of the piston within the housing, while an outer periphery of the valve plunger toward its front end is slidably fitted into the inner periphery of the housing and an outer periphery of the valve plunger toward its axial center is slidably fitted into the inner periphery of the housing for guiding a back-and-forth movement of the valve plunger within the housing.

2. A brake booster according to claim 1 in which the housing for the solenoid comprises a yoke in the form of a stepped cylinder which is fitted into the inner periphery of the valve body from the front side thereof, and a holder in the form of a stepped cylinder disposed forwardly of the yoke for holding the spool sandwiched between it and the yoke, the tubular guide of the piston being slidably fitted into the inner periphery of the holder while the annular guide of the piston is slidably fitted into the inner periphery of the yoke, the inner periphery of the holder being formed with a sliding guide which bulges radially inward and which is slidably fitted by the outer periphery of the valve plunger toward its front end, the outer periphery of the valve plunger toward its axial center being slidably fitted into the inner periphery of the yoke through a notch formed in the tubular member.

3. A brake booster according to claim 2 in which a plurality of axially extending guide grooves are formed in a circumferential boundary between the sliding guides, the tubular guide of the piston being formed with a plurality of forwardly extending elongated feet, which are slidably engaged with the axially extending guide grooves, the inner periphery of the yoke being formed towards its rear end with a plurality of axially extending engaging grooves, which are slidably engaged by axial portions of the tubular member which are located circumferentially adjacent to a notch formed in the tubular member.

4. A brake booster according to claim 2 in which a return spring is disposed within the constant pressure chamber of the shell for positioning the valve body at its rear inoperative position and in which an annular retainer is fitted around the outer periphery of the holder toward its front end from the front side, the rear end of the return spring being disposed in abutment against the retainer to urge the yoke, the spool and the holder toward the valve body from the front side, thus mounting them on the inner periphery of the valve body.

5. A brake booster according to claim 4 in which an annual seal member mounted on the rear end face of the spool maintains a hermitic seal between the stepped end face of the yoke and its abutting rear end face of the spool and an annual seal member mounted on the front end face of the spool maintains a hermetic seal between the stepped end face of the holder and its abutting front end face of the spool.

6. A brake booster according to claim 2 in which the yoke is formed with a notch at a given location in its rear portion, and the valve body is also formed with a radial bore at a given axial position, a key member being passed through the radial bore in the valve body, the notch in the yoke, and the notch in the tubular member before it is engaged with the valve plunger, the key member being capable of an axial relative movement with respect to the valve body in an extent defined by a spacing between the front and the rear edge of the notch in the yoke.

7. A brake booster according to claim 6 in which an advancing force acting on the input shaft subsequent to a full load point when the input shaft and the valve plunger are driven forward to actuate the brake booster is supported by the abutment of the key member against the front edge of the notch in the yoke.

8. A brake booster according to claim 2 in which an elastomer is mounted on the rear end face of the holder which opposes the front end face of the piston for preventing the occurrence of sounds of percussion.

9. A brake booster according to claim 2 in which the piston includes a rear shank which is formed with rearwardly extending tubular portion on which an annular guide and an engaging portion formed by an annular retainer are sequentially fitted from the rear side and then the rear end of the tubular portion is caulked radially outward to mount the annular guide and the engaging portion on the rear end face of the piston, the rear end of the engaging portion being formed with a flange which extends radially outward while the front end of the tubular member is formed with an engaging portion which extends radially inward, the engaging portion of the tubular member being slidably fitted around the outer periphery of the engaging portion of the piston so that a relative movement is axially permitted between the tubular member and the piston through a distance by which the engaging portion of the tubular member is movable between the annular guide on the piston and the flange of the engaging portion, a spring being disposed between the annular guide and the opposing stepped end of the tubular member to urge the tubular member and the piston normally away from each other to cause the engaging portion of the tubular member to abut against the flange of the engaging portion of the piston from the front side.

10. A brake booster according to claim 2 in which the tubular guide and the annular guide of the piston are formed of a non-magnetic material.

\* \* \* \* \*